Aug. 13, 1957  A. HILLE  2,802,304
CONTAINER FOR FLOWERPOTS
Filed Nov. 25, 1953

INVENTOR
ALFRED HILLE
BY
PATENT AGENT

United States Patent Office 2,802,304
Patented Aug. 13, 1957

2,802,304

CONTAINER FOR FLOWERPOTS

Alfred Hille, Altenkirchen, Westerwald, Germany

Application November 25, 1953, Serial No. 394,465

Claims priority, application Germany November 29, 1952

4 Claims. (Cl. 47—34)

The invention relates to a container for potted flowers and plants in the form of a stand with a surrounding wall or sleeve. Baked clay pots are the best permanent containers for flowers and plants on account of their permeability to air. In living rooms, however, the appearance of these pots is a disadvantage and in addition they must always be placed on a saucer or stand to prevent them from leaving moisture marks on furniture, window sills and the like.

Hitherto these clay pots have been placed in decorative or cover pots all of which are impermeable to air so that the plants mostly die. Cover pots for flowers are also known which are made of material impermeable to air but the walls of which are perforated to allow sufficient air to reach the clay pot and consequently the roots of the plants and to circulate around the clay pot. These cover pots are, however, rigid and have a solid upper edge. The clay pot and the cover pot must therefore be adapted the one to the other and, in particular, the upper diameter of the flower pot must not be larger than the internal diameter of the cover pot. It is known, however, that clay pots cannot be made to exact size, so that the cover pot must always be on the large side.

These objections are overcome according to the invention in that the flower pot is surrounded by a sleeve stand. This sleeve stand has not a rigid upper edge but is yieldable to the side wall of the flower pot right up to the top edge and adapts itself to the shape and size of the flower pot.

One form of the invention is illustrated in the accompanying drawing, in which.

Figure 1:
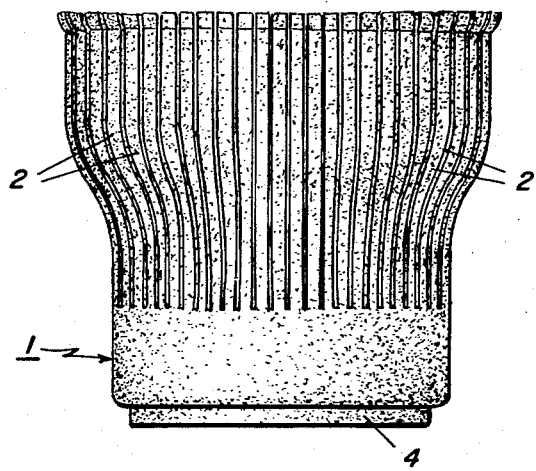
Fig. 1 shows a sleeve stand in side elevation.
Figure 2:
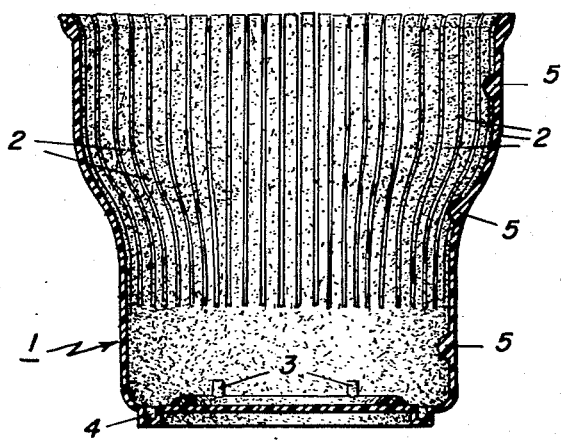
Fig. 2 is a vertical cross section taken on the diameter of the sleeve stand.

The sleeve stands according to the invention are preferably injection-moulded from plastic and can be made relatively thin walled and easily. The bottom closed part 1 is preferably provided with three small pins or feet 3 on which the flower pot rests. As a consequence a free space is formed under the flower pot in which any superfluous water can collect. If desired, the middle portion of the bottom with the pins may be slightly raised and the edge of the stand provided with one or more grooves 4 for accommodating further quantities of water.

The flexible tongues 2 extending from the rigid unbroken part and which yieldably surround the flower pot may be smooth on the inner side but are preferably provided with small mammilated projections or ribs 5 so that the flower pot is surrounded by a layer of air which can circulate between the wall of the flower pot and the sleeve.

The sleeve stand according to the invention may be made in any desired shape or color.

I claim:

1. An outer container for a flowerpot made of a material impervious to air, comprising a substantially nonelastic, cup-shaped and water-tight bottom part adapted to support said flower pot and relatively thin tongue-shaped, resilient members integral with and extending upwardly from said bottom part to form a yieldable enclosure for the side wall of said flower pot.

2. A container according to claim 1, wherein said bottom part is solidly made of a plastic material, and wherein said bottom part is integrally molded with said resilient tongue-shaped members.

3. A container according to claim 1, wherein the interior of said bottom part is provided with an endless circumferential groove adapted to collect surplus water.

4. A container according to claim 3, wherein raised seating surfaces for said flower pot in the form of projections are provided in said interior of said bottom part within the area surrounded by said groove.

References Cited in the file of this patent

UNITED STATES PATENTS

| 436,645 | Embleme | Sept. 2, 1890 |

FOREIGN PATENTS

| 28,130 | Great Britain | 1906 |
| 52,220 | Switzerland | Oct. 24, 1910 |